United States Patent [19]

Nagata et al.

[11] Patent Number: 5,084,545

[45] Date of Patent: Jan. 28, 1992

[54] RESIN HAVING A LARGE REFRACTIVE INDEX, LENSES COMPRISING THE RESIN AND PROCESS FOR PREPARING THE LENS

[75] Inventors: Teruyuki Nagata; Koju Okazaki, both of Ohmuta; Tohru Miura, Yokohama, all of Japan

[73] Assignee: Mitsui Toatsu Chemicals, Inc., Tokyo, Japan

[21] Appl. No.: 379,378

[22] Filed: Jul. 13, 1989

[30] Foreign Application Priority Data

| Jul. 14, 1988 | [JP] | Japan | 63-176064 |
| Jul. 21, 1988 | [JP] | Japan | 63-180361 |
| Jul. 21, 1988 | [JP] | Japan | 63-180362 |
| Jul. 27, 1988 | [JP] | Japan | 63-187569 |
| Jul. 27, 1988 | [JP] | Japan | 63-187570 |
| Jul. 27, 1988 | [JP] | Japan | 63-187571 |
| Aug. 3, 1988 | [JP] | Japan | 63-192681 |
| Aug. 30, 1988 | [JP] | Japan | 63-213751 |
| Aug. 30, 1988 | [JP] | Japan | 63-213752 |
| Sep. 6, 1988 | [JP] | Japan | 63-221355 |

[51] Int. Cl.$^5$ ............................................. C08L 75/00
[52] U.S. Cl. ...................................... 528/76; 524/710; 524/714; 524/731; 524/795; 528/83; 528/85; 351/159
[58] Field of Search .............................. 528/76, 83, 85; 524/710, 714, 731, 795; 351/159

[56] References Cited

U.S. PATENT DOCUMENTS 3,226,354   12/1965   Heiss .................................... 528/85

*Primary Examiner*—Maurice J. Welsh
*Assistant Examiner*—Rachel Johnson
*Attorney, Agent, or Firm*—Burns, Doane, Swecker & Mathis

[57] ABSTRACT

The present invention relates to a process for producing a resin useful in plastic lenses, to plastic lenses containing the resin and to a process for producing the lenses.

20 Claims, No Drawings

RESIN HAVING A LARGE REFRACTIVE INDEX, LENSES COMPRISING THE RESIN AND PROCESS FOR PREPARING THE LENS

BACKGROUND OF THE INVENTION

1. Field of the Invention

The present invention relates to a resin having a high refractive index that is useful for preparing plastic lenses, lenses comprising the resin and processes for preparing the same.

2. Description of the Prior Art

Plastic lenses have been rapidly popularized in recent years for use in optical elements such as lenses of eyeglasses and cameras. Plastic lenses are lightweight, less fragile than inorganic lenses and are capable of being dyed with ease.

A resin currently widely used for producing lenses for optical elements is a radical polymerization product of diethylene glycol bisallyl carbonate (herein-after abbreviated as DAC). The resin has excellent impact resistance, is lightweight, has prominent dye-affinity and good machinability including cutting ability and polishing ability.

However, lenses prepared from the resin have a smaller refractive index ($n_D=1.50$) than glass lenses ($n_D=1.52$). In order to obtain equivalent optical properties to glass lenses, it is necessary to increase the center thickness, peripheral thickness and curvature of the lens and hence the lens as a whole becomes very thick. Therefore, resins having a higher refractive index that are useful for making lenses are desired.

Resins having higher refractive indices that have been used to produce plastic lenses include polyurethane base resins obtained by reacting isocyanate compounds with hydroxyl compounds such as diethylene glycol (disclosed in Japanese Patent Laid-Open No. 136601/1982, U.S. Pat. No. 4,443,588), with halogen containing hydroxyl compounds such as tetrabromobisphenol-A (Japanese Patent Laid-Open No. 164615/1983) and with diphenyl sulfide linkage containing hydroxyl compounds (Japanese Patent Laid-Open No. 194401/1985).

The present inventors have previously invented resins having high refractive indices that are useful for preparing lenses by reacting isocyanate compounds with sulfur containing hydroxyl compounds (Japanese Patent Laid-Open No. 217229/1985, U.S. Pat. No. 4,680,369 and U.S. Pat. No. 4,780,522) or with polythiol compounds (Japanese Patent Laid-Open No. 199016/1985, U.S. Pat. No. 4,689,378, Japanese Patent Laid-Open Nos. 267316/1987 and 46213/1988, and U.S. Pat. No. 4,775,733). The present inventors prepared plastic lenses from their polyurethane base resins.

In molding the polyurethane base lens, it is usually difficult to release the polymerized lens from the mold due to adhesion between the polyurethane compounds and the mold. In order to improve the mold releasing property, the present inventors previously proposed a process in which an external mold releasing agent is used (Japanese Patent Laid-Open No. 267316/1987) or a process in which a polyolefin resin mold is used (Japanese Patent Laid-Open No. 236818/1987) to improve the mold release properties in preparing lenses.

Although the refractive indices of these lenses are higher than those of lenses prepared from DAC, the maximum refractive index of these lenses is between approximately 1.65 and 1.68. Further improvement of the refractive index is desired.

The above methods are still insufficient for improving the mold releasing property in casting polymerization of polyurethane base lenses.

In prior art processes in which external mold releasing agents are used, a portion of the agent that is applied to the inner surface of a mold migrates to the surface and interior of the polymerized lens which results in problems such as nonuniformity of the surface of the lens and turbidity of the lens. When a mold is used repeatedly, mold releasing treatment is required in each molding cycle. Such treatment lowers productivity in producing the lens and thus is extremely uneconomical in industrial production.

When the polyolefin resin molds are applied, the resin molds are deformed at elevated temperatures which causes large profile irregularities on the molded lens. Thus, the resin molds cannot be applied to articles requiring high accuracy on the molded surface.

SUMMARY OF THE INVENTION

The present invention overcomes the problems and disadvantages of the prior art by providing a resin having improved properties over prior art resins, a process for producing the same, and a lens containing the resin having superior properties over prior art lenses and a method of producing the same.

An object of the present invention is to provide a colorless and transparent resin having a high refractive index and low dispersion of refractive index which is suitable for use in producing a plastic lens which is lightweight, and is excellent in weatherability and impact resistance.

Another object of the invention is to provide a lens having high accuracy in the profile of surface and excellent optical properties and a process for producing the same which does not include specific release treatment of the inner mold surface of the mold used to make the lens.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a resin and a process for preparing the resin comprising reacting one or more isothiocyanate compounds with one or more active-hydrogen containing compounds selected from the group consisting of polyol compounds, polythiol compounds and mercapto group containing hydroxy compounds.

The invention also provides a lens containing the resin and a process for preparing the lens comprising adding an internal mold releasing agent to a mixture of one or more isothiocyanate compounds and one or more active-hydrogen containing compounds and cast polymerizing the mixture to form a lens.

The resin of the invention is colorless, transparent, has a high refractive index and low dispersion of refractive index and is particularly suitable for producing lenses.

The lenses of the invention are excellent in weatherability, lightweight and exhibits excellent impact resistance. The lens has excellent optical properties and is very accurate in the profile of the surface.

DESCRIPTION OF THE PREFERRED EMBODIMENTS

Reference will now be made in detail to the present preferred embodiments of the invention.

Exemplary suitable isothiocyanate compounds for use in the process of the present invention include polyisothiocyanate compounds and isothiocyanate compounds containing isocyanate groups. Such isothiocyanate compounds may contain one or more sulfur atoms in addition to the isothiocyanate groups. Exemplary suitable polyisothiocyanate compounds contain two or more -NCS groups per molecule and include, for example, aliphatic polyisothiocyanate compounds such as ethane-1,2-diisothiocyanate, propane-1,3-diisothiocyanate, butane-1,4-diisothiocyanate, hexane-1,6-diisothiocyanate, p-phenylenediisopropylidene diisothiocyanate; alicyclic polyisothiocyanate compounds such as cyclohexane diisothiocyanate; aromatic polyisothiocyanate compounds such as benzene-1,2-diisothiocyanate, benzene-1,3-diisothiocyanate, benzene-1,4-diisothiocyanate, toluene2,4-diisothiocyanate, m-xylene-2,5-diisothiocyanate, 1,1'-biphenyl-4,4'-diisothiocyanate, 1,1'-methylenebis(benzene-4-isothiocyanate), 1,1'-methylenebis(2-methylbenzene-4-benzene-4-isothiocyanate), 1,1'-methylenebis(3-methylbenzene-4-isothiocyanate), 1,1'-(1,2-ethane-diyl)bis(benzene-4-isothiocyanate), benzophenone-4,4'-diisothiocyanate, 3,3'-dimethylbenzophenone-4,4'-diisothiocyanate, benzanilide-3,4'-diisothiocyanate, diphenylether4,4'-diisothiocyanate, and diphenylamine-4,4'-diisothiocyanate; heterocyclic polyisothiocyanate compounds such as 1,3,5-triazine-2,4,6-triisothiocyanate; and carbonyl polyisothiocyanate compounds such as hexanedioyl diisothiocyanate, nonanedioyl diisothiocyanate, carbonic diisothiocyanate, benzene-1,3-dicarbonyl diisothiocyanate, benzene-1,4-dicarbonyl diisothiocyanate and (2,2'-bipyridine)-4,4'-diisothiocyanate.

Exemplary suitable polyisothiocyanate compounds containing at least one sulfur atom in addition to the isothiocyanate groups include sulfur containing aliphatic polyisothiocyanates such as thiobis(3-isothiocyanatopropane), thiobis(2-isothiocyanatoethane) and dithiobis(2-isothiocyanatoethane); sulfur containing aromatic polyisothiocyanates such as 1-isothiocyanato4-{(2-isothiocyanato)sulfonyl}benzene, thiobis(4-isothiocyanatobenzene), sulfonylbis(4-isothiocyanatobenzene), sulfinylbis(4-isothiocyanatobenzene), dithiobis(4-isothiocyanatobenzene), 4-isothiocyanato-1-{(4-isothiocyanatophenyl)sulfonyl}-2-methoxybenzene, 4-methyl-3-isothiocyanatobenzenesulfonyl-4'-isothiocyanate phenyl ester and 4-methyl-3-isothiocyanatobenzenesulfonylanilide3'-methyl-4'-isothiocyanate; and sulfur containing heterocyclic compounds such as thiophene-2,5-diisothiocyanate and 1,4-dithian-2,5-diisothiocyanate.

Exemplary suitable isocyanate group containing isothiocyanate compounds include aliphatic and alicyclic compounds such as propane-1-isocyanato-3-isothiocyanate, pentane-1-isocyanato-5-isothiocyanate, hexane-1-isocyanato-6-isothiocyanate, isothiocyanatocarbonyl isocyanate and cyclohexane-1-isocyanato-4-isothiocyanate; heterocyclic compounds such as 1,3,5-triazine-2-isocyanato-4,6-diisothiocyanate; and compounds having sulfur atoms in addition to isothiocyanate groups such as 4-isocyanato-4'-isothiocyanatodiphenyl sulfide and 2-isocyanato-2'-isothiocyanatodiethyl disulfide.

Exemplary suitable derivatives of the above isothiocyanate compounds for use in the invention include halogenated isothiocyanates such as chlorinated isothiocyanates and brominated isothiocyanates, alkylated isothiocyanates, alkoxylated isothiocyanates, nitrated isothiocyanates, prepolymer type addition products with polyhydric alcohols, carbodiimide modified isothiocyanates, urea modified isothiocyanates, biuret modified isothiocyanates, dimerization products and trimerization products.

The isothiocyanate compounds may be used singly or in combination as a mixture.

Exemplary active-hydrogen containing compounds suitable for use in the process of the invention are those selected from the group consisting of polyol compounds, polythiol compounds and mercapto group containing hydroxy compounds.

Exemplary suitable polyol compounds include aliphatic polyols such as ethylene glycol, diethylene glycol, propylene glycol, dipropylene glycol, butyleneglycol, neopentyl glycol, glycerol, trimethylolethane, trimethylolpropane, butanetriol, 1,2-methylglucoside, pentaerythritol, dipentaerythritol, tripentaerythritol, sorbitol, erythritol, threitol, ribitol, arabinitol, xylitol, allitol, mannitol, duloitol, iditol, glycol, inositol, hexanetriol, triglycerol, diglycerol, triethylene glycol, polyethylene glycol, tris(2-hydroxyethyl)isocyanurate, cyclobutanediol, cyclopentanediol, cyclohexanediol, cycloheptonediol, cyclooctanediol, cyclohexanedimethanol, hydroxypropylcyclohexanol, tricyclo[5,2,1,0$^{2.6}$]decanedimethanol, bicyclo[4,3,0]nonanediol, dicyclohexanediol, tricyclo[5,3,1,1]dodecanediol, bicyclo[4,3,0]nonanedimethanol, tricyclo[5,3,1,1-]dodecanediethanol, hydroxypropyltricyclo[5,3,1,1-]dodecanol, spiro[3,4]octanediol, butylcyclohexanediol, 1,1'-bicyclohexylidenediol, cyclohexanetriol, maltitol, lactitol; aromatic polyols such as dihydroxynaphthalene, trihydroxynaphthalene, tetrahydroxynaphthalene, hydroquinone, resorcinol, catechol, benzenetriol, biphenyltetraol, pyrogallol, (hydroxynaphthyl)pyrogallol, trihydroxyphenanthrene, bisphenol A, bisphenol-F, xylyleneglycol, di(2-hydroxyethoxy)benzene, bisphenol A-bis(2-hydroxyethylether), tetrabromobisphenol-A, tetrabromobisphenol A-bis(2-hydroxyethylether); halogenated polyols such as dibromoneopentylglycol; and high molecular polyols such as epoxy resin.

Additional exemplary polyols suitable for use in the process of the invention include condensed products of above mentioned polyol compounds with organic acids such as oxalic acid, glutamic acid, adipic acid, acetic acid, propionic acid, cyclohexanecarboxylic acid, β-hydroxycyclohexanepropionic acid, dimer acid, phthalic acid, isophthalic acid, salicylic acid, 3-bromopropionic acid, 2-bromoglycolic acid, cyclohexanedicarboxylic acid, pyromellitic acid, butanetetracarboxylic acid and bromophthalic acid; addition products of alkylene oxides such as ethylene oxide and propylene oxide to the above polyol compounds and to alkylenepolyamine: and sulfur atom containing polyols such as bis[4-(hydroxyethoxy)phenyl]sulfide, bis[4-(2hydroxypropoxy)phenyl]sulfide, bis[4-(2,3-dihydroxypropoxy)phenyl]sulfide, bis[4-(4-hydroxycyclohexyloxy)phenyl]sulfide, bis[2-methyl-4-(hydroxyethoxy)6-butylphenyl]sulfide, compounds obtained by the addition of ethylene oxide and/or propylene oxide to sulfur containing polyols in an amount of not more than about 3 moles per mole of hydroxyl group of the polyols, di(2-hydroxyethyl) sulfide, 1,2-bis(2-hydroxyethylmercapto)ethane, bis(2-hydroxyethyl)disulfide, 1,4-dithian-2,5-diol, bis(2,3-dihydroxypropyl)sulfide, tetrakis(4-hydroxy-2-thiabutyl)methane, bis(4-hydroxyphenyl) sulfone (Trade Mark; Bisphenol-S), tetramethylbisphenol-S, 4,4'-thiobis(6-tert-butyl-3-methylphenol) and 1,3-bis(2-hydroxyethylthioethyl)cyclohexane.

Exemplary suitable polythiols for use in the process of the invention include aliphatic polythiols such as methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxybutane-1,2-dithiol, 2-methylcyclohexane-2,3-dithiol, bicyclo[2,3,1]hepta-exo-cis-2,3-dithiol, 1,1-bis(mercaptomethyl)cyclohexane, thiomalic acid bis(2-mercaptoethyl ester), 2,3-dimercaptosuccinic acid 2-mercaptoethyl ester, 2,3-dimercapto-1-propanol 2-mercaptoacetate, 2,3-dimercapto-1-propanol 3-mercaptopropionate, diethylene glycol bis(2-mercaptoacetate), diethylene glycol bis(3-mercaptopropionate), 1,2-dimercaptopropyl methyl ether, 2,3-dimercaptopropyl methyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane bis(2-mercaptoacetate), trimethylolpropane bis(3-mercaptopropionate), pentaerythritol tetrakis(2-mercaptoacetate) and pentaerythritol tetrakis(3-mercaptopropionate); aromatic polythiols such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2-bis(mercaptomethyleneoxy)benzene, 1,3-bis(mercaptomethyleneoxy)benzene, 1,4-bis(mercaptomethyleneoxy)benzene, 1,2-bis(mercaptoethyleneoxy)benzene, 1,3-bis(mercaptoethylenoxy)benzene, 1,4-bis(mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 1,2,3-tris(mercaptomethyleneoxy)benzene, 1,2,4-tris(mercaptomethyleneoxy)benzene, 1,3,5-tris(mercaptomethyleneoxy)benzene, 1,2,3-tris(mercaptoethyleneoxy)benzene, 1,2,4-tris(mercaptoethyleneoxy)benzene, 1,3,5-tris(mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 1,2,3,4-tetrakis(mercaptomethyleneoxy)benzene, 1,2,3,5-tetrakis(mercaptomethyleneoxy)benzene, 1,2,4,5-tetrakis(mercaptomethyleneoxy)benzene, 1,2,3,4-tetrakis(mercaptoethyleneoxy)benzene, 1,2,3,5-tetrakis(mercaptoethyleneoxy)benzene, 1,2,4,5-tetrakis(mercaptoethyleneoxy)benzene, 2,2'-dimercaptobiphenyl, 4,4'-dimercaptobiphenyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracenedimethanethiol, 1,3-di(p-methoxyphenyl)propane-2,2-dithiol, 1,3-diphenylpropane-2,2-dithiol, phenylmethane-1,1-dithiol and 2,4-di(p-mercaptophenyl)pentane; chlorinated and brominated aromatic polythiols such as 2,5-dichlorobenzene-1,3-dithiol, 1,3-(p-chlorophenyl)-propane-2,2-dithiol, 3,4,5-tribromo-1,2-dimercaptobenzene and 2,3,4,6-tetrachloro-1,5-bis(mercaptomethyl)benzene; heterocyclic polythiols such as 2-methylamino-3,6-dithiol-sym-triazine, 2-ethylamino-4,6-dithiol-sym-triazine, 2-amino-4,6-dithiol-sym-triazine, 2-morpholino-4,6-dithiol-symtriazine, 2-cyclohexylamino-4,6-dithiol-sym-triazine, 2-methoxy-4,6-dithiol-sym-triazine, 2-phenoxy-4,6-dithiol-sym-triazine, 2-thiobenzeneoxy-4,6-dithiolsym-triazine and 2-thiobutyloxy-4,6-dithiol-sym-triazine; aromatic polythiols containing sulfur atoms in addition to mercapto groups such as 1,2-bis(mercaptomethylthio)benzene, 1,3-bis(mercaptomethylthio)benzene, 1,4-bis(mercaptomethylthio)benzene, 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5tris(mercaptomethylthio)benzene, 1,2,3-tris(mercaptoethylthio)benzene, 1,2,4-tris(mercaptoethylthio)benzene, 1,3,5-tris(mercaptoethylthio)benzene, 1,2,3,4-tetrakis(mercaptomethylthio)benzene, 1,2,3,5-tetrakis(mercaptomethylthio)benzene, 1,2,4,5-tetrakis(mercaptomethylthio)benzene, 1,2,3,4-tetrakis(mercaptoethylthio)benzene, 1,2,3,5-tetrakis(mercaptoethylthio)benzene, 1,2,4,5-tetrakis(mercaptoethylthio)benzene and aromatic ring alkylated derivatives of these polythiols; aliphatic polythiols containing sulfur atoms in addition to mercapto groups such as bis(mercaptomethyl) sulfide, bis(mercaptoethyl) sulfide, bis(mercaptopropyl) sulfide, bis(mercaptomethylthio)methane, bis(2-mercaptoethylthio)methane, bis(3-mercaptopropyl)methane, 1,2-bis(mercaptomethylthio)ethane, 1,2-bis(2-mercaptoethylthio)ethane, 1,2-bis(3-mercaptopropyl)ethane, 1,3-bis(mercaptomethylthio)propane, 1,3-bis(2-mercaptoethylthio)propane, 1,3-bis(3-mercaptopropylthio)propane, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl) sulfide, 2,5-dimercapto-1,4-dithian, bis(mercaptomethyl) disulfide, bis(mercaptoethyl) disulfide and bis(mercaptopropyl) disulfide; esters of mercaptoacetic acid, mercaptopropionic acid and mercaptobutyric acid with sulfur containing compounds such as hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxypropyl sulfide bis(2-mercaptoacetate), hydroxypropyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), hydroxypropyl disulfide bis(2-mercaptoacetate), hydroxypropyl disulfide bis(3-mercaptopropionate), 2-mercaptoethyl ether bis(2-mercaptoacetate), 2-mercaptoethyl ether bis(3-mercaptopropionate), 1,4-dithian-2,5-diol bis(2-mercaptoacetate), 1,4-dithian-2,5-diol bis(3-mercaptopropionate), thiodiglycolic acid bis(2-mercaptoethyl ester), thiodipropionic acid bis(2-mercaptoethyl ester), 4,4-thiodibutyric acid bis(2-mercaptoethyl ester), dithiodiglycolic acid bis(2-mercaptoethyl ester), dithiodipropionic acid bis(2-mercaptoethyl ester), 4,4-dithiodibutyric acid bis(2-mercaptoethyl ester), thiodiglycolic acid bis(2,3-dimercaptopropyl ester), thiodipropionic acid bis(2,3-dimercaptopropyl ester), dithiodiglycolic acid bis(2,3-dimercaptopropyl ester) and dithiodipropionic acid bis(2,3-dimercaptopropyl ester); and heterocyclic compounds containing sulfur atoms in addition to mercapto groups such as 3,4-thiophenedithiol and 2,5dimercapto-1,3,4-thiadiazol.

Exemplary suitable mercapto group containing hydroxy compounds for use in the process of this invention include mercaptoalkanols, mercaptocycloalkanols and mercapto phenols such as 2-mercaptoethanol, 3-mercapto1,2-propanediol, glycerol di(mercaptoacetate), 1-hydroxy4-mercaptocyclohexane, 2,4-dimercaptophenol, 2-mercaptohydroquinone, 4-mercaptophenol, 3,4-dimercapto-2-propanol, 1,3-dimercapto-2-propanol, 2,3-dimercapto-1propanol, 1,2-dimercapto-1,3-butanediol, pentaerythritol tris(3-mercaptopropionate), pentaerythritol mono(3-mercaptopropionate), pentaerythritol bis(3-mercaptopropionate), pentaerythritol tris(thioglycolate), pentaerythritol tetrakis(3-mercaptopropionate); and mercapto group and sulfur atom containing alkanols and phenols such as hydroxymethyltris(mercaptoethylthiomethyl)methane, 1-hydroxyethylthio-3-mercaptoethylthiobenzene, 4-hydroxy-4'-mercaptodiphenyl sulfone, 2-(2-mercaptoethylthio)ethanol, dihydroxyethyl sulfide mono(3-mercaptopropionate), dimercaptoethane monosalicylate, and hydroxyethylthiomethyl-tris(mercaptoethylthiomethyl)methane.

Halogenated derivatives of these active-hydrogen containing compounds such as chlorinated derivatives and brominated derivatives may also be used.

These active-hydrogen containing compounds may be used singly or in combination as a mixture.

The isothiocyanate compounds and the active-hydrogen containing compounds are employed in amount of from about 0.5 to about 3.0 moles of total functional isocyanate and isothiocyanate groups per mole of total hydroxyl and mercapto groups, preferably from about 0.5 to about 1.5 moles of sum of functional isocyanate group and isothiocyanate group per mole of sum of hydroxyl group and mercapto group.

A portion of the isothiocyanate compounds used in the process of this invention may be replaced by polyisocyanate compounds.

Various additives such as chain extending agents, cross linking agents, light stabilizers, ultraviolet absorbers, antioxidants, oil soluble dyestuffs and fillers may be incorporated to achieve particular desired properties.

Known catalysts which are used for the preparation of polyurethane may also be used, if necessary, to adjust the reaction rate in the desired range.

Exemplary suitable compounds for use as an internal mold releasing agent in the process of the invention include fluorine containing nonionic surface active agents, silicon containing nonionic surface active agents, alkyl quaternary ammonium salts, acid phosphate esters, liquid paraffins, waxes, higher fatty acids and their salts, higher fatty acid esters, higher aliphatic alcohols, bisamides, polysiloxanes, and adducts of ethylene oxide to aliphatic amines.

The internal mold releasing agent is suitably selected on the basis of monomer combination, polymerization conditions, economy and readiness in handling. The agent may be used singly or as a mixture of two or more such agents.

Exemplary suitable fluorine containing nonionic surface active agents and silicon containing nonionic surface active agents suitable for use in the process of the invention include compounds containing perfluoroalkyl groups or dimethyl polysiloxane groups and hydroxyalkyl groups or phosphate ester groups. Exemplary suitable fluorine containing nonionic surface active agents include Unidain TM: DS-401 and DS-403 (Products of Daikin Kogyo Co., Ltd.) and F-Top TM; EF-122A, EF-126 and EF-301 (Products of Shin-Akita Chemical Co., Ltd.). An exemplary suitable silicon containing nonionic surface active agent is a trial product Q2-120A of Dow Chemical Co.

Exemplary suitable alkyl quaternary ammonium salts for use in the process of the invention include cationic surface active agents such as alkyl quaternary ammonium halogenides, phosphates and sulfates such as trimethylcetyl ammonium chloride, trimethylstearyl ammonium chloride, dimethylethylcetyl ammonium chloride, triethyldodecyl ammonium chloride, trioctylmethyl ammonium chloride, and diethylcyclohexyldodecyl ammonium chloride.

Exemplary suitable acid phosphate esters for use in the process of the invention include isopropyl acid phosphate, diisopropyl acid phosphate, butyl acid phosphate, dibutyl acid phosphate, octyl acid phosphate, dioctyl acid phosphate, isodecyl acid phosphate, diisodecyl acid phosphate, tridecanol acid phosphate, and bis(tridecanol acid)phosphate.

Exemplary suitable metal salts of higher fatty acid for use in this invention include zinc, calcium, magnesium, nickel and copper salts of stearic acid, oleic acid, octanoic acid, lauric acid, behenic acid and ricinoleic acid such as zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate copper laurate, and copper palmitate.

Exemplary suitable higher fatty acid esters for use in the process of the invention include esters obtained by the reaction of higher fatty acids such as stearic acid, oleic acid, octanoic acid, lauric acid and ricinoleic acid with alcohols such as ethylene glycol, propylene glycol, butanediol, neopentyl glycol and hexanediol.

The internal mold releasing agent may be used singly or in combination. The total amount of the releasing agents used is from about 0.1 to about 10,000 ppm, preferably from about 1 to about 5,000 ppm per sum of the isothiocyanate compounds and active-hydrogen containing compounds. When used in an amount less than 0.1 ppm, demolding ability becomes poor. When used in an amount greater than 10,000 ppm, the molded lens causes haze. The excess amount also results in poor profile accuracy of the lens surface due to premature release of the molded lens from the mold surface during polymerization.

The lens of the invention can usually be produced by casting polymerization. One or more isothiocyanate compounds are preferably mixed with one or more active-hydrogen containing compounds and internal mold releasing agents, incorporated with additives, catalysts or the like if necessary, and then poured into a mold to carry out polymerization. In this step, the resultant mixture is usually deaerated prior to pouring to prevent bubbles in the molded lens.

Although the temperature and time of polymerization differ depending upon the type of monomer and additives such as mold releasing agent, the polymerization is generally carried out for from about 0.5 to about 72 hours at a temperature of from about −50° C. to about 200° C., preferably from room temperature to about 150° C., more preferably from room temperature to about 120° C.

Annealing of the polymerized lens may be conducted when necessary.

The polyurethane base lens obtained has a high profile accuracy of the molded surface and excellent optical properties, is lightweight, excellent in impact resistance and suitable for use as eyeglass lenses and camera lenses.

The high refraction lens of this invention can be imparted with the following properties: antireflection, surface hardness, abrasion resistance, chemical resistance, fog resistance and fashionability by subjecting the lens to physical or chemical treatment such as surface polishing, antistatic treatment, hard coating, antireflection coating, dyeing and dimming.

This invention will hereinafter be illustrated by way of the following examples and comparative examples, which are intended to be purely exemplary of the invention. In testing the properties of the lens resin obtained, refractive index, Abbe's number, weatherability, mold release property and appearance were measured by the following methods.

Refractive index and Abbe's number:
Measured at 20° C. with a Pulfrich refractometer.
Mold release property:
After completing the polymerization, a Teflon wedge was struck in the interface of the lens and glass mold. The results were divided into the following two classes.
○ . . . Quite readily released.
X . . . Release was partly or wholly impossible.
Appearance:
Evaluation was conducted by visual observation.

EXAMPLE-1A

A mixture of 13.5 g (0.07 mole) of benzene1,4-diisothiocyanate and 7.7 g (0.07 mole) of hydroquinone was poured into a mold consisting of a glass mold and a gasket. The mold was then gradually heated from room temperature to 120° C., taking 48 hours to complete the polymerization. The lens obtained was colorless and transparent. The lens had a refractive index $n_D^{20}$ of 1.78.

EXAMPLES 2A-43A AND COMPARATIVE EXAMPLES 1A-9A

The same procedures as described in Example 1A were carried out for preparing lenses by using the composition illustrated in Table 1.

Results of testing physical properties are summarized in Table 1.

EXAMPLE 1B

A mixture of 13.5 g (0.07 mole) of benzene1,4-diisothiocyanate, 7.7 g (0.07 mole) of hydroquinone and 0.02 g of dodecanol acid phosphate was poured into a mold consisting of a glass mold and a gasket. Then the mold was gradually heated from room temperature to 120° C., taking 24 hours to complete the polymerization. After completing the polymerization, the lens was readily released from the mold. The lens obtained had a good profile accuracy of surface was colorless and transparent, and had a refractive index $n_D^{20}$ of 1.78.

EXAMPLES 2B-59B

The same procedures as described in Example 1B were carried out for preparing lenses by using the compositions illustrated in Table 2. Results on the physical property test are illustrated in Table 2.

COMPARATIVE EXAMPLES 1B-36B

The same procedures as described in Example 1B were carried out for preparing lenses except that molds were used under conditions described below and compositions set forth in Table 3 were used. The results are summarized in Table 3.

The descriptions in the mold treatment column in Table 3 also indicates the following conditions.
(1) No treatment . . . A glass mold was used without any releasing treatment.
(2) External releasing treatment . . . External mold releasing agent YSR-6209 TM (product of Toshiba Silicon Co.) was applied and baked on the inner surface of a glass mold.
(3) Recycled use . . . The glass mold obtained by the external releasing treatment was once employed for the polymerization and then used again without any further treatment.
(4) PP-mold . . . A polypropylene mold was prepared by injection molding and used in place of the glass mold without any surface treatment.

TABLE 1

| No. | Isothiocyanate compound | | Active-hydrogen containing compound | | Appearance | Refractive index |
|---|---|---|---|---|---|---|
| Example-1A | SCN—⌬—NCS | 0.07 mol | HO—⌬—OH | 0.07 mol | Transparent colorless | 1.78 |
| Example-2A | SCN-triazine-(NCS)₂ | 0.04 mol | HO—⌬—S—⌬—OH | 0.06 mol | Transparent colorless | 1.73 |
| Example-3A | SCN—(CH₂)₆—NCS | 0.06 mol | " | 0.06 mol | Transparent colorless | 1.69 |
| Example-4A | SCN—⌬—NCS | 0.07 mol | HOC₂H₄SC₂H₄OH | 0.07 mol | Transparent colorless | 1.69 |
| Example-5A | SCN—(CH₂)₆—NCS | 0.05 mol | C(CH₂SCH₂CH₂SH)₄ | 0.025 mol | Transparent colorless | 1.70 |
| Example-6A | SCN—⌬—NCS | 0.05 mol | C(CH₂SCH₂CH₂SH)₄ | 0.025 mol | Transparent colorless | 1.75 |
| Example-7A | SCN-triazine-(NCS)₂ | 0.05 mol | HS—⌬—SH | 0.05 mol | Transparent colorless | 1.80 |
| Example-8A | SCN—⌬—NCS | 0.06 mol | CH(CH₂SCH₂CH₂SH)₃ / CH₂SCH₂CH₂OH | 0.03 mol | Transparent colorless | 1.74 |

TABLE 1-continued

| No. | Isothiocyanate compound | | Active-hydrogen containing compound | | Appearance | Refractive index |
|---|---|---|---|---|---|---|
| Example-9A | ![SCN-triazine-(NCS)₂ structure] | 0.08 mol | CH₂CHCH₂<br>\|  \|  \|<br>SH OHOH | 0.08 mol | Transparent colorless | 1.72 |
| Example-10A | SCN(CH₂)₃NCS | 0.08 mol | HS—⟨phenyl⟩—OH | 0.08 mol | Transparent colorless | 1.72 |
| Example-11A | SCN—⟨phenyl⟩—SS—⟨phenyl⟩—NCS | 0.04 mol | C(CH₂SCH₂CH₂OH)₄ | 0.02 mol | Transparent colorless | 1.73 |
| Example-12A | SCN—⟨phenyl⟩—SO₂CH₂CH₂NCS | 0.06 mol | ![1,3-dithiane-2-ol structure] | 0.04 mol | Transparent colorless | 1.74 |
| Example-13A | SCN—⟨phenyl⟩—SS—⟨phenyl⟩—NCS | 0.06 mol | CH₂CHCH₂<br>\|  \|  \|<br>OH OHOH | 0.04 mol | Transparent colorless | 1.76 |
| Example-14A | (S—CH₂CH₂NCS)₂ | 0.04 mol | HO—⟨phenyl⟩—S—⟨phenyl⟩—OH | 0.06 mol | Transparent colorless | 1.74 |
| Example-15A | SCN—⟨phenyl⟩—S—S—⟨phenyl⟩—NCS | 0.04 mol | C(CH₂SCH₂CH₂SH)₄ | 0.02 mol | Transparent colorless | 1.77 |
| Example-16A | SCN—⟨phenyl⟩—SO₂CH₂CH₂NCS | 0.06 mol | HS—⟨phenyl⟩—SH (1,3) | 0.04 mol | Transparent colorless | 1.76 |

TABLE 1-continued

| No. | Isothiocyanate compound | | Active-hydrogen containing compound | | Appearance | Refractive index |
|---|---|---|---|---|---|---|
| Example-17A | SCN-C₆H₄-S-S-C₆H₄-NCS | 0.06 mol | C(CH₂SH)₄ | 0.03 mol | Transparent colorless | 1.80 |
| Example-18A | SCN(CH₂)₂S(CH₂)₂NCS | 0.06 mol | C(CH₂SCH₂CH₂SH)₄ | 0.03 mol | Transparent colorless | 1.73 |
| Example-19A | SCN-C₆H₄-SS-C₆H₄-NCS | 0.05 mol | C(CH₂SCH₂CH₂SH)₃(CH₂SCH₂CH₂OH) | 0.025 mol | Transparent colorless | 1.76 |
| Example-20A | SCN-C₆H₄-S-C₆H₄-NCS | 0.08 mol | HS-C₆H₄-OH | 0.08 mol | Transparent colorless | 1.76 |
| Example-21A | S(CH₂CH₂NCS)₂ | 0.08 mol | C(CH₂SCH₂CH₂SH)₃(CH₂SCH₂CH₂OH) | 0.04 mol | Transparent colorless | 1.71 |
| Example-22A | OCN-C₆H₄-NCS | 0.06 mol | C(CH₂SCH₂CH₂SH)₄ | 0.03 mol | Transparent colorless | 1.72 |
| Example-23A | " | 0.06 mol | HO-C₆H₄-SH | 0.03 mol | Transparent colorless | 1.72 |
| Example-24A | " | 0.06 mol | HO-C₆H₄-OH | 0.06 mol | Transparent colorless | 1.70 |
| Example-25A | OCN-C(=O)-NCS | 0.06 mol | HO-C₆H₄-S-S-C₆H₄-SH | 0.03 mol | Transparent colorless | 1.71 |

TABLE 1-continued

| No. | Isothiocyanate compound | | Active-hydrogen containing compound | | Appearance | Refractive index |
|---|---|---|---|---|---|---|
| Example-26A | OCNCH$_2$CH$_2$CH$_2$NCS | 0.06 mol | 4,4'-bis(mercaptophenyl) disulfide | 0.06 mol | Transparent colorless | 1.75 |
| Example-27A | 4,4'-diisocyanatodiphenyl sulfide | 0.06 mol | 4-hydroxythiophenol | 0.06 mol | Transparent colorless | 1.74 |
| Example-28A | " | 0.06 mol | C(CH$_2$SCH$_2$CH$_2$SH)$_3$ CH$_2$SCH$_2$OH | 0.03 mol | Transparent colorless | 1.72 |
| Example-29A | " | 0.06 mol | C(CH$_2$SCH$_2$CH$_2$SH)$_4$ | 0.03 mol | Transparent colorless | 1.71 |
| Example-30A | S(CH$_2$CH$_2$NCO)$_2$ / S(CH$_2$CH$_2$NCS)$_2$ | 0.06 mol | 4,4'-dihydroxydiphenyl sulfide 4-hydroxy-4'-mercaptodiphenyl sulfide | 0.03 mol 0.03 mol | Transparent colorless | 1.72 |
| Example-31A | OCNCH$_2$CH$_2$CH$_2$NCS | 0.06 mol | HOCH$_2$CH$_2$SCH$_2$CH$_2$OH | 0.06 mol | Transparent colorless | 1.69 |
| Example-32A | OCNCH$_2$CH$_2$CH$_2$NCS | 0.06 mol | 1,3-dimercaptobenzene | 0.04 mol | Transparent colorless | 1.75 |
| Example-33A | 4-isocyanato-4'-isothiocyanatodiphenyl sulfide | 0.06 mol | CH$_2$CHCH$_2$ \| \| \| CH$_2$CHCH$_2$ \| \| \| OH OH OH | 0.04 mol | Transparent colorless | 1.72 |

TABLE 1-continued

| No. | Isothiocyanate compound | | Active-hydrogen containing compound | | Appearance | Refractive index |
|---|---|---|---|---|---|---|
| Example-34A | OCN-C6H4-S-C6H4-NCS | 0.06 mol | C(CH₂SH)₄ | 0.03 mol | Transparent colorless | 1.76 |
| Example-35A | SCN—(CH₂)₆—NCS | 0.07 mol | C(CH₂SCH₂CH₂SH)₄ | 0.04 mol | Transparent colorless | 1.78 |
| | OCNCH₂CH₂NCS | 0.01 mol | | | | |
| Example-36A | SCN-C6H4-SS-C6H4-NCS | 0.01 mol | C(CH₂SCH₂CH₂SH)₃CH₂SCH₂CH₂OH | 0.04 mol | Transparent colorless | 1.74 |
| | OCNCH₂CH₂NCS | 0.07 mol | | | | |
| Example-37A | (SCH₂CH₂NCS)₂ | 0.07 mol | C(CH₂SCH₂CH₂OH)₄ | 0.04 mol | Transparent colorless | 1.73 |
| | OCN-C6H4-NCS | 0.01 mol | | | | |
| Example-38A | SCN-C6H4-NCS | 0.01 mol | C(CH₂SH)₄ | 0.04 mol | Transparent colorless | 1.77 |
| | OCNCH₂CH₂CH₂NCS | 0.07 mol | | | | |
| Example-39A | OCN-C6H4-S-C6H4-NCS | 0.01 mol | C(CH₂SCH₂CH₂SH)₃CH₂SCH₂CH₂OH | 0.04 mol | Transparent colorless | 1.74 |
| | OCNCH₂CH₂CH₂NCS | 0.07 mol | | | | |

TABLE 1-continued

| No. | Isothiocyanate compound | | Active-hydrogen containing compound | | Appearance | Refractive index |
|---|---|---|---|---|---|---|
| Example-40A | (SCH$_2$CH$_2$NCS)$_2$ | 0.08 mol | HO-⟨Ph⟩-S-⟨Ph⟩-OH | 0.02 mol | Transparent colorless | 1.75 |
| | | | C(CH$_2$SCH$_2$CH$_2$SH) | 0.03 mol | | |
| Example-41A | SCN-⟨Ph⟩-S-S-⟨Ph⟩-NCS | 0.08 mol | C(CH$_2$SH)$_4$ | 0.01 mol | Transparent colorless | 1.73 |
| | | | CH$_2$CHCH$_2$<br>\|   \|<br>SH OHOH | 0.04 mol | | |
| Example-42A | SCN(CH$_2$)$_6$NCS | 0.04 mol | C(CH$_2$SCH$_2$CH$_2$SH)$_4$ | 0.035 mol | Transparent colorless | 1.72 |
| | (SCH$_2$CH$_2$NCS)$_2$ | 0.04 mol | C(CH$_2$SCH$_2$CH$_2$SH)$_3$<br>CH$_2$SCH$_2$CH$_2$OH | 0.005 mol | | |
| Example-43A | OCN-⟨Ph⟩-S-⟨Ph⟩-NCS | 0.01 mol | HS-⟨Ph⟩-S-S-⟨Ph⟩-SH | 0.08 mol | Transparent colorless | 1.75 |
| | SCN(CH$_2$)$_7$NCS | 0.07 mol | | | | |
| Comparative Example-1A | OCN—(CH$_2$)$_6$NCO | 0.07 mol | HOCH$_2$CH$_2$CH$_2$CH$_2$OH | 0.07 mol | Transparent colorless | 1.50 |
| Comparative Example-2A | ⟨Ph⟩(CH$_2$NCO)$_2$ | 0.08 mol | C(CH$_2$OCC$_2$H$_4$SH)$_4$<br>        ‖<br>        O | 0.04 mol | Transparent colorless | 1.59 |

TABLE 1-continued

| No. | Isothiocyanate compound | | Active-hydrogen containing compound | | Appearance | Refractive index |
|---|---|---|---|---|---|---|
| Comparative Example-3A | OCN—(CH$_2$)$_6$—NCO | 0.07 mol | HO—C$_6$H$_4$—S—C$_6$H$_4$—OH | 0.07 mol | Transparent colorless | 1.62 |
| Comparative Example-4A | OCN(CH$_2$)$_6$NCO | 0.05 mol | C(CH$_2$SCH$_2$CH$_2$SH)$_4$ | 0.025 mol | Transparent colorless | 1.62 |
| Comparative Example-5A | OCN(CH$_2$)$_6$NCO | 0.08 mol | HS—C$_6$H$_4$—OH | 0.08 mol | Transparent colorless | 1.61 |
| Comparative Example-6A | (S—CH$_2$CH$_2$NCO)$_2$ | 0.06 mol | HO—C$_6$H$_4$—S—C$_6$H$_4$—OH | 0.06 mol | Transparent colorless | 1.67 |
| Comparative Example-7A | OCN(CH$_2$)$_2$S(CH$_2$)$_2$NCO | 0.06 mol | C(CH$_2$SCH$_2$CH$_2$SH)$_4$ | 0.03 mol | Transparent colorless | 1.66 |
| Comparative Example-8A | S(CH$_2$CH$_2$NCO)$_2$ | 0.08 mol | C[(CH$_2$SCH$_2$CH$_2$SH)$_3$, CH$_2$SCH$_2$CH$_2$OH] | 0.04 mol | Transparent colorless | 1.64 |
| Comparative Example-9A | 1,3-bis(CH$_2$NCO)benzene | 0.06 mol | tetrabromobisphenol A | 0.06 mol | Transparent light yellow | 1.61 |

TABLE 2

| Example No. | Isothiocyanate compound | | Active-hydrogen containing compound | | Internal releasing agent | Mold release | Appearance | Refractive index |
|---|---|---|---|---|---|---|---|---|
| -1B | SCN—⟨C₆H₄⟩—NCS | 0.07 mol | HO—⟨C₆H₄⟩—OH | 0.07 mol | Dodecanol acid phosphate 1000 ppm | ○ | Good surface accuracy Transparent colorless | 1.78 |
| -2B | SCN—⟨C₆H₄⟩—NCS | 0.07 mol | HO—⟨C₆H₄⟩—OH | 0.07 mol | Unidain DS-403 (Daikin) 500 ppm | ○ | Good surface accuracy Transparent colorless | 1.78 |
| -3B | SCN(CH₂)₆NCS | 0.07 mol | HO—⟨C₆H₄⟩—S—⟨C₆H₄⟩—OH | 0.07 mol | Q2-120A (Dow) 300 ppm | ○ | Good surface accuracy Transparent colorless | 1.69 |
| -4B | SCN(CH₂)₆NCS | 0.07 mol | HO—⟨C₆H₄⟩—S—⟨C₆H₄⟩—OH | 0.07 mol | Trimethyloctyl ammonium chloride 500 ppm | ○ | Good surface accuracy Transparent colorless | 1.69 |
| -5B | SCN(CH₂)₆NCS | 0.04 mol | C(CH₂SCH₂CH₂SH)₄ | 0.08 mol | Unidain DS-403 (Daikin) 300 ppm | ○ | Good surface accuracy Transparent colorless | 1.70 |
| -6B | SCN(CH₂)₆NCS | 0.04 mol | C(CH₂SCH₂CH₂SH)₄ | 0.08 mol | Unidain DS-401 (Daikin) 100 ppm Q2-120A (Dow) 100 ppm | ○ | Good surface accuracy Transparent colorless | 1.70 |
| -7B | SCN—⟨C₆H₄⟩—NCS | 0.04 mol | C(CH₂SCH₂CH₂SH)₄ | 0.08 mol | Diisopropyl acid phosphate 500 ppm | ○ | Good surface accuracy Transparent colorless | 1.75 |
| -8B | SCN—⟨C₆H₄⟩—NCS | 0.04 mol | C(CH₂SCH₂CH₂SH)₄ | 0.08 mol | Trimethyloctyl ammonium chloride 500 ppm | ○ | Good surface accuracy Transparent colorless | 1.75 |
| -9B | SCN—⟨C₆H₄⟩—NCS | 0.04 mol | C(CH₂SCH₂CH₂SH)₃ CH₂SCH₂CH₂OH | 0.08 mol | Unidain DS-401 (Daikin) 100 ppm | ○ | Good surface accuracy Transparent colorless | 1.74 |

TABLE 2-continued

| Example No. | Isothiocyanate compound | Active-hydrogen containing compound | Internal releasing agent | Mold release | Appearance | Refractive index |
|---|---|---|---|---|---|---|
| -10B | 1,4-phenylene diisothiocyanate (SCN–C₆H₄–NCS) | 0.08 mol C(CH₂SCH₂CH₂SH)₃<br>CH₂SCH₂CH₂OH | 0.04 mol Q2-120A (Dow) | 100 ppm | ○ | Good surface accuracy Transparent colorless | 1.74 |
| -11B | 2,4,6-triisothiocyanato-1,3,5-triazine | 0.06 mol CH₂CHCH₂<br>   |   |<br>SH OHOH | 0.06 mol Unidain DS-403 (Daikin) | 100 ppm | ○ | Good surface accuracy Transparent colorless | 1.72 |
| -12B | 2,4,6-triisothiocyanato-1,3,5-triazine | 0.06 mol CH₂CHCH₂<br>   |   |<br>SH OHOH | 0.03 mol Unidain DS-403 (Daikin) | 100 ppm | ○ | Good surface accuracy Transparent colorless | 1.76 |
| | | 0.03 mol 1,3-benzenedithiol (HS–C₆H₄–SH) | | | | |
| -13B | 2,4,6-triisothiocyanato-1,3,5-triazine | 0.06 mol 1,3-benzenedithiol | 0.06 mol Q2-120A (Dow) | 150 ppm | ○ | Good surface accuracy Transparent colorless | 1.80 |
| -14B | SCN–(CH₂)₆–NCS<br>OCN–(CH₂)₆–NCO | 0.04 mol<br>0.02 mol 4,4'-thiobisbenzenethiol (HS–C₆H₄–S–C₆H₄–SH) | 0.06 mol Trimethyloctyl ammonium chloride | 500 ppm | ○ | Good surface accuracy Transparent colorless | 1.75 |
| -15B | SCN(CH₂)₆NCS + 4-isothiocyanatophenyl isothiocyanate | 0.03 mol<br>0.03 mol C(CH₂SCH₂CH₂SH)₄ | 0.03 mol Unidain DS-401 (Daikin) | 200 ppm | ○ | Good surface accuracy Transparent colorless | 1.73 |

TABLE 2-continued

| Example No. | Isothiocyanate compound | | Active-hydrogen containing compound | | Internal releasing agent | | Mold release | Appearance | Refractive index |
|---|---|---|---|---|---|---|---|---|---|
| -16B | SCN—C₆H₄—SS—C₆H₄—NCS | | C(CH₂SCH₂CH₂OH)₄ | 0.04 mol | Dodecanol acid phosphate | 1000 ppm | ○ | Good surface accuracy Transparent colorless | 1.73 |
| -17B | SCN—C₆H₄—SO₂CH₂CH₂NCS | | 2-hydroxy-1,3-dithiolane (CH₂–S–CH(OH)–CH₂–S) | 0.04 mol | Unidain DS-403 (Daikin) | 500 ppm | ○ | Good surface accuracy Transparent colorless | 1.74 |
| -18B | SCN—C₆H₄—SS—C₆H₄—NCS | | CH₂CHCH₂<br>\|  \|  \|<br>OH OH OH | 0.06 mol | Q2-120A (Dow) | 300 ppm | ○ | Good surface accuracy Transparent colorless | 1.76 |
| -19B | (—S—CH₂CH₂NCS)₂ | | HO—C₆H₄—S—C₆H₄—OH | 0.06 mol | Triethyloctyl ammonium chloride | 500 ppm | ○ | Good surface accuracy Transparent colorless | 1.74 |
| -20B | SCN—C₆H₄—SS—C₆H₄—NCS | | C(CH₂SCH₂CH₂SH)₄ | 0.04 mol | Unidain DS-403 (Daikin) | 300 ppm | ○ | Good surface accuracy Transparent colorless | 1.77 |
| -21B | SCN—C₆H₄—SS—C₆H₄—NCS | | C(CH₂SCH₂CH₂SH)₄ | 0.04 mol | Unidain DS-401 (Daikin) Q2-120A (Dow) | 100 ppm 100 ppm | ○ | Good surface accuracy Transparent colorless | 1.77 |
| -22B | SCN—C₆H₄—SO₂CH₂CH₂NCS | | 2,5-dimercapto-benzene (HS—C₆H₄—SH) | 0.06 mol | Diisopropyl acid phosphate | 500 ppm | ○ | Good surface accuracy Transparent colorless | 1.76 |
| -23B | SCN—C₆H₄—SS—C₆H₄—NCS | | C(CH₂SH)₄ | 0.06 mol | Trimethyloctyl ammonium chloride | 500 ppm | ○ | Good surface accuracy Transparent colorless | 1.80 |
| -24B | SCN(CH₂)₂S(CH₂)₂NCS | | C(CH₂SCH₂CH₂SH)₃ | 0.06 mol | Unidain DS-401 (Daikin) | 100 ppm | ○ | Good surface accuracy Transparent colorless | 1.73 |

TABLE 2-continued

| Example No. | Isothiocyanate compound | Active-hydrogen containing compound | | Internal releasing agent | | Mold release | Appearance | Refractive index |
|---|---|---|---|---|---|---|---|---|
| -25B | SCN—C₆H₄—SS—C₆H₄—NCS | 0.05 mol | C(CH₂SCH₂CH₂SH)₃ CH₂SCH₂CH₂OH | 0.025 mol | Q2-120A (Dow) 100 ppm | ○ | Good surface accuracy Transparent colorless | 1.76 |
| -26B | SCN—C₆H₄—S—C₆H₄—NCS | 0.08 mol | HS—C₆H₄—OH | | Unidain DS-403 (Daikin) 100 ppm | ○ | Good surface accuracy Transparent colorless | 1.76 |
| -27B | SCN—C₆H₄—S—C₆H₄—NCS | 0.03 mol | HS—C₆H₄—OH C(CH₂SH)₄ | 0.08 mol 0.025 mol | Unidain DS-403 (Daikin) 100 ppm | ○ | Good surface accuracy Transparent colorless | 1.77 |
| -28B | S(CH₂CH₂NCS)₂ | 0.08 mol | C(CH₂SCH₂CH₂SH)₃ CH₂SCH₂CH₂OH | | Q2-120A (Dow) 150 ppm | ○ | Good surface accuracy Transparent colorless | 1.71 |
| -29B | S(CH₂CH₂NCS)₂ | 0.08 mol | C(CH₂SCH₂CH₂SH)₃ CH₂SCH₂CH₂OH | | Unidain DS-401 (Daikin) 150 ppm | ○ | Good surface accuracy Transparent colorless | 1.71 |
| -30B | SCN—C₆H₄—SS—C₆H₄—NCS ; CH₂NCO—C₆H₄—CH₂NCO | 0.04 mol 0.04 mol | C(CH₂SH)₄ | 0.04 mol | Trimethyloctyl ammonium chloride 500 ppm | ○ | Good surface accuracy Transparent colorless | 1.73 |
| -31B | OCN—C₆H₄—NCS | 0.08 mol | C(CH₂SCH₂CH₂SH)₄ | 0.04 mol | Dodecanol acid phosphate 1000 ppm | ○ | Good surface accuracy Transparent colorless | 1.72 |

TABLE 2-continued

| No. Example | Isothiocyanate compound | | Active-hydrogen containing compound | | Internal releasing agent | | Mold release | Appearance | Refractive index |
|---|---|---|---|---|---|---|---|---|---|
| -32B | OCN—⬡—NCS | | C(CH₂SCH₂CH₂SH)₄ | 0.08 mol | Unidain DS-403 (Daikin) | 500 ppm | ○ | Good surface accuracy Transparent colorless | 1.72 |
| -33B | OCN—⬡—NCS | | HO—⬡—SH | 0.08 mol | Q2-120A (Dow) | 300 ppm | ○ | Good surface accuracy Transparent colorless | 1.72 |
| -34B | OCN—⬡—NCS | | HO—⬡—OH | 0.08 mol | Trimethyloctyl ammonium phosphate | 500 ppm | ○ | Good surface accuracy Transparent colorless | 1.70 |
| -35B | OCN—C—NCS ‖ O | | HO—⬡—SS—⬡—SH | 0.08 mol | Unidain DS-403 (Daikin) | 300 ppm | ○ | Good surface accuracy Transparent colorless | 1.71 |
| -36B | OCN—C—NCS ‖ O | | HO—⬡—SS—⬡—SH | 0.08 mol | Unidain DS-401 (Daikin) Q2-102A (DOW) | 100 ppm 100 ppm | ○ | Good surface accuracy Transparent colorless | 1.71 |
| -37B | OCN—⬡—S—⬡—NCS | | HO—⬡—SH | 0.06 mol | Diisopropyl acid phosphate | 500 ppm | ○ | Good surface accuracy Transparent colorless | 1.74 |
| -38B | OCNCH₂CH₂CH₂NCS | | HS—⬡—SS—⬡—SH | 0.06 mol | Trimethyloctyl ammonium chloride | 500 ppm | ○ | Good surface accuracy Transparent colorless | 1.75 |
| -39B | OCN—⬡—S—⬡—NCS | | C(CH₂SCH₂CH₂SH)₃ CH₂SCH₂CH₂OH | 0.06 mol | Unidain DS-401 (Daikin) | 100 ppm | ○ | Good surface accuracy Transparent colorless | 1.72 |
| -40B | S—CH₂CH₂NCO \| S—CH₂CH₂NCS | | C(CH₂SCH₂CH₂SH)₄ | 0.08 mol | Q2-120A (Dow) | 100 ppm | ○ | Good surface accuracy Transparent colorless | 1.71 |

TABLE 2-continued

| Example No. | Isothiocyanate compound | | Active-hydrogen containing compound | | Internal releasing agent | | Mold release | Appearance | Refractive index |
|---|---|---|---|---|---|---|---|---|---|
| 41B | S—CH₂CH₂NCO<br>\|<br>S—CH₂CH₂NCS | 0.06 mol | 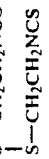 | 0.03 mol<br>0.03 mol | Q2-120A<br>(Dow) | 100 ppm | ○ | Good surface accuracy<br>Transparent colorless | 1.72 |
| 42B | 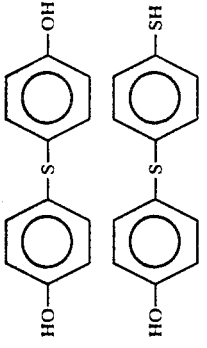 | 0.03 mol | 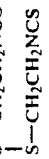 | 0.03 mol<br>0.03 mol | Dodecanol acid phosphate | 500 ppm | ○ | Good surface accuracy<br>Transparent colorless | 1.75 |
| 43B | 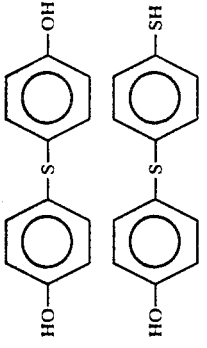 | 0.03 mol | 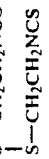 | 0.03 mol<br>0.03 mol | Trimethyloctyl ammonium chloride | 500 ppm | ○ | Good surface accuracy<br>Transparent colorless | 1.72 |
| 44B | S—CH₂CH₂NCO<br>\|<br>S—CH₂CH₂NCS | 0.03 mol<br>0.05 mol | C(CH₂SCH₂CH₂SH)₄ | 0.03 mol | Unidain DS-401 (Daikin) | 200 ppm | ○ | Good surface accuracy<br>Transparent colorless | 1.72 |
|  | 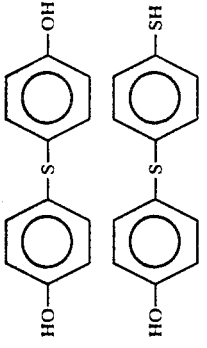 |  |  |  |  |  |  |  |  |
| 45B | OCNCH₂CH₂NCS | | HOCH₂CH₂SCH₂CH₂OH | 0.06 mol | Diisopropyl acid phosphate | 500 ppm | ○ | Good surface accuracy<br>Transparent colorless | 1.69 |

TABLE 2-continued

| Example No. | Isothiocyanate compound | | Active-hydrogen containing compound | | Internal releasing agent | | Mold release | Appearance | Refractive index |
|---|---|---|---|---|---|---|---|---|---|
| 46B | OCNCH$_2$CH$_2$CH$_2$NCS | | HS–⟨benzene⟩–SH | 0.06 mol | Unidain SD-403 (Daikin) | 300 ppm | ○ | Good surface accuracy Transparent colorless | 1.75 |
| 47B | OCN–⟨phenyl⟩–S–⟨phenyl⟩–NCS | 0.04 mol | CH$_2$CHCH$_2$ \| \| \| OH OHOH | 0.06 mol | Trimethyloctyl ammonium chloride | 500 ppm | ○ | Good surface accuracy Transparent colorless | 1.72 |
| 48B | OCN–⟨phenyl⟩–S–⟨phenyl⟩–NCS | 0.04 mol | C(CH$_2$SH)$_4$ | 0.06 mol | Dodecanol acid phosphate Diisopropyl acid phosphate | 100 ppm 500 ppm | ○ | Good surface accuracy Transparent colorless | 1.76 |
| 49B | SCN–⟨phenyl⟩–SS–⟨phenyl⟩–NCS | 0.03 mol | C(CH$_2$SCH$_2$CH$_2$SH)$_4$ | 0.07 mol | Q2-120A (Dow) | 100 ppm | ○ | Good surface accuracy Transparent colorless | 1.78 |
| 50B | SCN–⟨phenyl⟩–NCS OCNCH$_2$CH$_2$NCS | 0.04 mol | C(CH$_2$SCH$_2$CH$_2$SH)$_3$ \\ CH$_2$SCH$_2$CH$_2$OH | 0.01 mol 0.07 mol | Unidain DS-401 (Daikin) | 100 ppm | ○ | Good surface accuracy Transparent colorless | 1.74 |
| 51B | (SCH$_2$CH$_2$NCS)$_2$ OCN–⟨phenyl⟩–NCS | 0.04 mol | C(CH$_2$SCH$_2$CH$_2$OH)$_4$ | 0.07 mol 0.01 mol | Unidain DS-401 (Daikin) | 100 ppm | ○ | Good surface accuracy Transparent colorless | 1.73 |
| 52B | SCN–⟨phenyl⟩–NCS OCNCH$_2$CH$_2$NCS | 0.04 mol | C(CH$_2$SH)$_4$ | 0.01 mol 0.07 mol | Diisopropyl acid phosphate | 500 ppm | ○ | Good surface accuracy Transparent colorless | 1.77 |

TABLE 2-continued

| Example No. | Isothiocyanate compound | Active-hydrogen containing compound | Internal releasing agent | Mold release | Appearance | Refractive index |
|---|---|---|---|---|---|---|
| -53B | OCN—⌬—S—⌬—NCS 0.01 mol<br>OCNCH₂CH₂CH₂NCS 0.07 mol | (CH₂SCH₂CH₂SH)₃<br>C<br>CH₂SCH₂CH₂OH 0.04 mol | Diisopropyl acid phosphate | 500 ppm | ○ | Good surface accuracy Transparent colorless | 1.74 |
| -54B | (—SCH₂CH₂NCS)₂ 0.02 mol | HO—⌬—S—⌬—OH 0.03 mol<br>C(—CH₂SCH₂CH₂SH)₄ | Diisopropyl acid phosphate | 500 ppm | ○ | Good surface accuracy Transparent colorless | 1.75 |
| -55B | SCN—⌬—SS—⌬—NCS 0.08 mol | C(—CH₂SH)₄ 0.01 mol<br>CH₂ClCHCH₂ 0.04 mol<br>SH OHOH | Diisopropyl acid phosphate | 500 ppm | ○ | Good surface accuracy Transparent colorless | 1.73 |
| -56B | SCN(—CH₂)₆NCS 0.035 mol<br>(—SCH₂CH₂NCS)₃ 0.005 mol | C(—CH₂SCH₂CH₂SH)₄ 0.04 mol<br>CH₂SCH₂CH₂OH 0.04 mol | Diisopropyl acid phosphate | 500 ppm | ○ | Good surface accuracy Transparent colorless | 1.72 |
| -57B | SCN(CH₂)₃NCS 0.08 mol | HS—⌬—OH 0.08 mol | Diisopropyl acid phosphate | 500 ppm | ○ | Good surface accuracy Transparent colorless | 1.72 |
| -58B | SCH₂CH₂NCO<br>SCH₂CH₂NCS 0.06 mol | HO—⌬—S—⌬—OH 0.06 mol | Diisopropyl acid phosphate | 500 ppm | ○ | Good surface accuracy Transparent colorless | 1.71 |
| -59B | OCN—⌬—S—⌬—NCS 0.08 mol<br>SCN(CH₂)₃NCS 0.07 mol | HS—⌬—S—S—⌬—SH 0.01 mol | Diisopropyl acid phosphate | 500 ppm | ○ | Good surface accuracy Transparent colorless | 1.75 |

TABLE 3

| No. Comparative Example | Polyisothiocyanate | | Active-hydrogen compound | | Mold treatment | Mold release | Appearance | Refractive index |
|---|---|---|---|---|---|---|---|---|
| -1B | SCN—⟨C6H4⟩—NCS | 0.07 mol | HO—⟨C6H4⟩—OH | 0.07 mol | No treatment | X | — | — |
| -2B | " | | " | | External releasing treatment | ○ | Non uniformity of surface Colorless, Transparent | 1.78 |
| -3B | " | | " | | Recycled use (from Comparat. Example-2B) | X | — | — |
| -4B | " | | " | | PP-mold | ○ | Poor surface accuracy Colorless, Transparent | 1.78 |
| -5B | SCN(CH$_2$)$_6$NCS | 0.08 mol | C(CH$_2$SCH$_2$CH$_2$SH)$_4$ | 0.04 mol | No treatment | X | — | — |
| -6B | " | | " | | External releasing treatment | ○ | Non uniformity of surface Colorless, Transparent | 1.70 |
| -7B | " | | " | | Recycled use (from Comparat. Example-6B) | X | — | — |
| -8B | " | | " | | PP-mold | ○ | Poor surface accuracy Colorless, Transparent | 1.70 |
| -9B | (triazine-NCS)$_3$ | | CH$_2$CHCH$_2$<br>SH OHOH | 0.03 mol | No treatment | X | — | — |
| -10B | " | | HS—⟨C6H4⟩—SH | 0.03 mol | External releasing treatment | ○ | Poor surface accuracy Colorless, Transparent | 1.76 |
| -11B | " | | " | | Recycled use (from Comparat. Example-10B) | X | — | — |

TABLE 3-continued

| No. Comparative Example | Polyisothiocyanate | | Active-hydrogen compound | | Mold treatment | Mold release | Appearance | Refractive index |
|---|---|---|---|---|---|---|---|---|
| -12B | " | | " | | PP-mold | ○ | Poor surface accuracy | 1.76 |
| -13B | SCN—⟨⟩—SS—⟨⟩—NCS | 0.04 mol | C-(CH$_2$SCH$_2$CH$_2$OH)$_4$ | 0.02 mol | No treatment | X | — | — |
| -14B | " | | " | | External releasing treatment | ○ | Non uniformity of surface Colorless, Transparent | 1.73 |
| -15B | " | | " | | Recycled use (from Comparat. Example-14B) | X | — | — |
| -16B | SCN—⟨⟩—SO$_2$CH$_2$CH$_2$NCS | 0.06 mol | " | | PP-mold | ○ | Poor surface accuracy Colorless, Transparent | 1.73 |
| -17B | " | | HS—⟨⟩—SH (with SH) | 0.04 mol | No treatment | X | — | — |
| -18B | " | | " | | External releasing treatment | ○ | Non uniformity of surface Colorless, Transparent | 1.76 |
| -19B | SCN—⟨⟩—SO$_2$CH$_2$CH$_2$NCS | 0.06 mol | " | | Recycled use (from Comparat. Example-18B) | X | — | — |
| -20B | " | | HS—⟨⟩—SH (with SH) | 0.06 mol | PP-mold | ○ | Poor surface accuracy Colorless, Transparent | 1.76 |
| -21B | SCN—⟨⟩—S—⟨⟩—NCS | 0.08 mol | HO—⟨⟩—SH | 0.03 mol | No treatment | X | — | — |
| -22B | " | | C-(CH$_2$SH)$_4$ | 0.025 mol | External | ○ | Non uniformity | 1.77 |

TABLE 3-continued

| No. Comparative Example | Polyisothiocyanate | | Active-hydrogen compound | | Mold treatment | Mold release | Appearance | Refractive index |
|---|---|---|---|---|---|---|---|---|
| -23B | " | | " | | Recycled use (from Comparat. Example-22B) PP-mold | X | of surface Colorless, Transparent | — |
| -24B | " | | " | | No treatment | O | Poor surface accuracy Colorless, Transparent | 1.77 |
| -25B | OCN—C₆H₄—NCS | 0.08 mol | HO—C₆H₄—SH | 0.08 mol | — | X | — | — |
| -26B | " | 0.08 mol | " | 0.08 mol | External releasing treatment | O | Non uniformity of surface Colorless, Transparent | 1.72 |
| -27B | " | 0.08 mol | " | 0.08 mol | Recycled use (from Comparat. Example-26B) | X | — | — |
| -28B | " | 0.08 mol | " | 0.08 mol | PP-mold | O | Poor surface accuracy Colorless, Transparent | 1.72 |
| -29B | S—CH₂CH₂NCO \| S—CH₂CH₂NCS | 0.08 mol | C—(CH₂SCH₂CH₂SH)₄ | 0.04 mol | No treatment | X | — | — |
| -30B | " | 0.08 mol | " | 0.04 mol | External releasing treatment | O | Non uniformity of surface Colorless, Transparent | 1.71 |
| -31B | " | 0.08 mol | " | 0.04 mol | Recycled use (from Comparat. Example-30B) | X | — | — |
| -32B | " | 0.08 mol | " | 0.04 mol | PP-mold | O | Poor surface accuracy Colorless, Transparent | 1.71 |
| -33B | S—CH₂CH₂NCO \| S—CH₂CH₂NCS | 0.08 mol | HO—C₆H₄—S—C₆H₄—OH | 0.04 mol | No treatment | X | — | — |

TABLE 3-continued

| No. Comparative Example | Polyisothiocyanate | Active-hydrogen compound | Mold treatment | Mold release | Appearance | Refractive index |
|---|---|---|---|---|---|---|
| -34B | " | HO—⟨C₆H₄⟩—S—⟨C₆H₄⟩—SH  0.04 mol | External releasing treatment | ○ | Non uniformity of surface Colorless, Transparent | 1.72 |
| -35B | " | " | Recycled use (from Comparat. Example-34B) | X | — | — |
| -36B | " | " | PP-mold | ○ | Poor surface accuracy Colorless, Transparent | 1.72 |

What is claimed is:

1. A plastic lens comprising the reaction product of one or more isothiocyanate compounds with one or more active hydrogen containing compounds selected from the group consisting of polyol compounds, polythiol compounds and hydroxy compounds containing mercapto group.

2. A process for producing a plastic lens comprising adding at least one internal mold releasing agent to a mixture of one or more isothiocyanate compounds and one or more active hydrogen containing compounds selected from the group consisting of polyol compounds, polythiol compounds and hydroxy compounds containing mercapto group followed by casting polymerization.

3. The plastic lens produced by the process of claim 2.

4. The plastic lens of claim 1 wherein the isothiocyanate compounds are polyisothiocyanate compounds and/or isothiocyanate compounds containing isocyanate group.

5. The process of claim 2 wherein the isothiocyanate compounds are polyisothiocyanate compounds and/or isothiocyanate compounds containing isocyanate group.

6. The plastic lens produced by the process of claim 5.

7. The plastic lens of claim 1 wherein the isothiocyanate compounds contain at least one sulfur atom in addition to the isothiocyanate groups.

8. The process of claim 2 wherein the isothiocyanate compounds contain at least one sulfur atom in addition to the isothiocyanate groups.

9. The plastic lens produced by the process of claim 8.

10. The plastic lens of claim 1 wherein the active hydrogen containing compounds selected from the group consisting of polyol compounds, polythiol compounds and hydroxy compounds containing mercapto group contain at least one sulfur atom other than mercapto group.

11. The process of claim 2 wherein the active hydrogen compounds selected from the group consisting of polyol compounds, polythiol compounds and hydroxy compounds containing mercapto group contain at least one sulfur atom other than mercapto group.

12. The plastic lens produced by the process of claim 11.

13. The plastic lens of claim 1 wherein the proportion of the isothiocyanate compound to the active hydrogen containing compound is a mole ratio of from about 0.5 to about 3.0 moles of the sum of functional isothiocyanate group and isocyanate group per mole of the sum of hydroxyl group and mercapto group.

14. The process of claim 2 wherein the proportion of the isothiocyanate compound to the active hydrogen containing compound is a mole ratio of from about 0.5 to about 3.0 moles of the sum of functional isothiocyanate group and isocyanate group per mole of the sum of hydroxyl group and mercapto group.

15. The plastic lens produced by the process of claim 14.

16. The process of claim 2 wherein the internal mold releasing agent is selected from the group consisting of fluorine containing nonionic surface active agents, silicon containing nonionic surface active agents, alkyl quaternary ammonium salts and acid phosphate esters.

17. The plastic lens produced by the process of claim 16.

18. The process of claim 2 wherein the internal mold releasing agent is present in an amount of from about 0.1 to about 10,000 ppm per sum of the isothiocyanate compound and the active hydrogen containing compound.

19. The plastic lens produced by the process of claim 18.

20. The process of claim 2 wherein the casting polymerization is carried out at a temperature from about $-50°$ C. to about $200°$ C.

* * * * *